US008649269B2

(12) United States Patent
Monogioudis (10) Patent No.: US 8,649,269 B2
(45) Date of Patent: Feb. 11, 2014

(54) METHOD OF CONTROLLING RESOURCE USAGE IN COMMUNICATION SYSTEMS

(75) Inventor: Pantelis Monogioudis, Randolph, NJ (US)

(73) Assignee: Alcatel Lucent, Paris (FR)

( * ) Notice: Subject to any disclaimer, the term of this patent is extended or adjusted under 35 U.S.C. 154(b) by 760 days.

(21) Appl. No.: 12/656,071

(22) Filed: Jan. 15, 2010

(65) Prior Publication Data

US 2011/0176433 A1 Jul. 21, 2011

(51) Int. Cl.
*H04L 12/26* (2006.01)

(52) U.S. Cl.
USPC .......................................................... 370/238

(58) Field of Classification Search
USPC .............. 370/230, 230.1, 231, 232, 235, 236, 370/236.1, 238, 238.1, 395.21, 395.4, 229
See application file for complete search history.

(56) References Cited

U.S. PATENT DOCUMENTS

| 6,034,946 | A | * | 3/2000 | Roginsky et al. | ............ 370/238 |
| 6,888,842 | B1 | * | 5/2005 | Kirkby et al. | ................. 370/414 |
| 6,996,401 | B2 | | 2/2006 | Agin | |
| 7,433,311 | B1 | * | 10/2008 | Kalyanasundaram et al. | ............................ 370/235 |
| 8,229,451 | B2 | | 7/2012 | Frenger et al. | |
| 2004/0218529 | A1 | * | 11/2004 | Rodosek et al. | ............. 370/235 |
| 2006/0067217 | A1 | * | 3/2006 | Li et al. | ......................... 370/230 |

FOREIGN PATENT DOCUMENTS

| JP | 2002315062 A | 10/2002 |
| WO | WO 2008055548 A1 * | 5/2008 |
| WO | WO-2008135101 A1 | 11/2008 |

OTHER PUBLICATIONS

Qualcomm Europe: "Updated Performance for Interference Coordination for Delay Sensitive Traffic in CSG Environment," 3GPP Draft, R1-094886 Hetnet CSG, $3^{rd}$ Generation Partnership Project (3GPP), Mobile Competence Centre, 650, Route Des Lucioles, F-06921 Sophia-Antipolis Cedex, France, Nov. 9, 2009, XP050389256, retrieved on Nov. 3, 2009.
Qualcomm Europe: "Utility Messages for HeNB ICIC," 3GPP Draft, R4-094851 Messages for HeNB ICIC, $3^{rd}$ Generation Partnership Project (3GPP), Mobile Competence Centre, 650, Route Des Lucioles, F-06921 Sophia-Antipolis Cedex, France, Oct. 12, 2009, XP050394309, retrieved Nov. 17, 2009.
Cmcc et al., Text Proposal on LTE TDD HeMB Interference Control, 3GPP Draft, R4-100178, $3^{rd}$ Generation Partnership Project (3GPP), Mobile Competence Centre, 650, Route Des Lucioles, F-06921 Sophia-Antipolis Cedex, France, vol. RAN WG4, No. Sophia, Jan. 14, 2010, XP050427871, retrieved on Jan. 14, 2010.
Qualcomm Europe: "Advantages of Interference Coordination for Delay Sensitive Traffic in CSG Environment," 3GPP Draft, R1-094227 Hetnet CSG, $3^{rd}$ Generation Partnership Project (3GPP), Mobile Competence Centre, 650, Route Des Lucioles, F-06921 Sophia-Antipolis Cedex, France, No. Miyazaki, Oct. 12, 2009, XP050388692, retrieved Oct. 6, 2009.
Japanese Notice of Reason for Refusal dated Sep. 26, 2013 for related Japanese Application No. 2012-548968 (full translation provided).

* cited by examiner

*Primary Examiner* — Michael Thier
*Assistant Examiner* — Feben M Haile
(74) *Attorney, Agent, or Firm* — Harness, Dickey & Pierce (57) ABSTRACT

In one embodiment, the method includes receiving, at the communication node, resource usage price information. The resource usage price information characterizes a cost associated with the communication node using a resource. The communication node determines an amount of the resource to use based on the received resource usage price information.

23 Claims, 3 Drawing Sheets

METHOD OF CONTROLLING RESOURCE USAGE IN COMMUNICATION SYSTEMS

BACKGROUND OF THE INVENTION

Management of resources within a wireless communication system is always of concern. However, with the advent of small cell systems and their overlap with other wireless communication systems, this concern has grown. Small cells may include picocells, femtocells, relay nodes and in general any node that defines explicitly or implicitly a new cell. When overlapped by a larger or macro cell system, the multiple systems are considered layers and are collectively referred to as heterogeneous networks (HTN).

Figure 1:
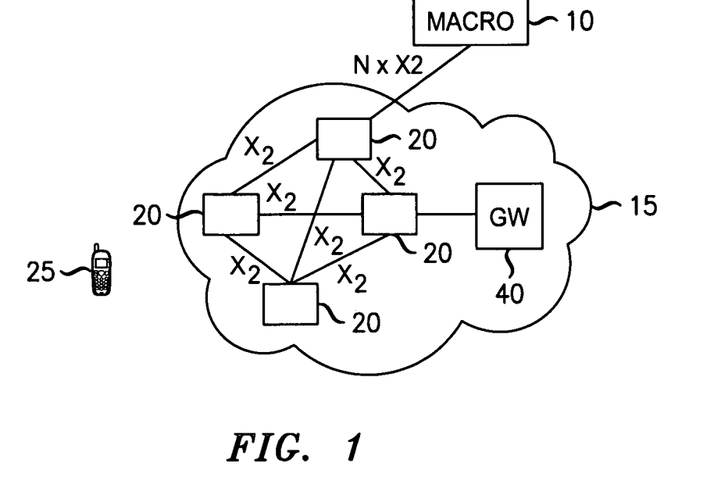
FIG. 1 illustrates a portion of a conventional heterogeneous network (HTN) having multiple stacked cell layers.

FIG. 1 illustrates a portion of a conventional heterogeneous network (HTN) having multiple stacked cell layers. FIG. 1 shows the coverage area of a macro cell served by a macro base station 10 also called an evolved NodeB or eNodeB. As shown, the coverage area includes a network 15 of pico cells, each served by a pico base station 20 also called a pico evolved NodeB or pico eNodeB. User equipment (UE) 25 falls within the coverage area of one or more of the pico base stations 20 and therefore the coverage area of the macro base station 10. The communication needs of the UE may be served by one of the communication nodes—pico base stations 20 or macro base station 10. If served by a pico base station 20, the UE's traffic may traverse the pico network 15 (i.e., from pico eNodeB to pico eNodeB) to a gateway 40, and from the gateway 40 to other networks and/or the internet. Also, the UE's traffic may traverse the pico network 15 to the macro base station 10, and from the macro base station 10 to other networks and/or the internet. Still further, the UE's traffic may flow directly to and from the macro base station 10. As will be appreciated additional and/or different network layers may be present. For example, in addition to or instead of the pico network 15, a Femto network may exist or individual Femto cells may exist.

In today's networking architecture for small cells, a well-known X2 interface is established between the small cell of interest and each neighboring small cell. As shown in FIG. 1, this forms an X2 interface cloud among the pico base stations 20. Similarly, an X2 interface between the small cell of interest and each neighboring macrocell are set up. This is also shown in FIG. 1, with the macro base station 10 having N X2 interfaces with N pico base stations 20. The X2 interfaces carry information such as for managing interference from base station to base station. Interference problems are far worse in HTNs because of the overlapping layers; therefore, managing the use of resources (e.g., transmission power, transmission rate, etc.), which affect interference becomes more important.

SUMMARY OF THE INVENTION

The present invention relates to a method of controlling resource usage at a communication node.

In one embodiment, the method includes receiving, at the communication node, resource usage price information. The resource usage price information characterizes a cost associated with the communication node using a resource. The communication node determines an amount of the resource to use based on the received resource usage price information.

For example, the resource may be one of a frequency resource, a time resource, a power resource and a code resource.

In one embodiment, the receiving step receives a resource usage unit price for each link associated with the communication node as the resource usage price information. Each resource usage unit price characterizes a cost to the communication node to use the resource at the expense of other communication nodes associated with the link.

For example, each link may represent a virtual link between the communication nodes associated with a shared air interface.

In one embodiment, the method includes second determining, at the communication node, an aggregate price quantity from the received resource usage price information. The aggregate price quantity characterizes the cost of using the resource at the expense of other communication nodes being able to use the resource. Here, the communication node determines the amount of the resource to use based on the determined aggregate price quantity.

In one embodiment, the receiving step receives a resource usage unit price for each link associated with the communication node as the resource usage price information. Each resource usage unit price characterizes a cost to the communication node to use the resource at the expense of other communication nodes associated with the link. Here, the communication node determines the aggregate price quantity from the received resource usage unit prices.

In one embodiment, the method further includes third determining, at the communication node for each link with which the communication node is associated, a next resource usage unit price based on a current resource usage unit price. The communication node then sends the determined resource usage unit prices to the communication nodes associated with the links.

In one embodiment, the communication node determines the amount of resource to use based on the determined aggregate price quantity and a utility function. The utility function characterizes utility derived by the communication node based on the amount of the resource used at the communication node.

In another embodiment, the method includes sending, from a control entity, the resource usage price information to the plurality of nodes. This embodiment may also include determining the resource usage price information at the control entity.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the term "user equipment" may be considered synonymous to, and may hereafter be occasionally referred to, as a mobile, mobile unit, mobile station, mobile user, subscriber, user, remote station, access terminal, receiver, etc., and may describe a remote user of wireless resources in a wireless communication network. The term "base station" may be considered synonymous to and/or referred to as a base transceiver station (BTS), NodeB, extended NodeB, evolved NodeB, femto cell, pico cell, access point, etc. and may describe equipment that provides the radio baseband functions for data and/or voice connectivity between a network and one or more users.

Architecture

Figure 2:
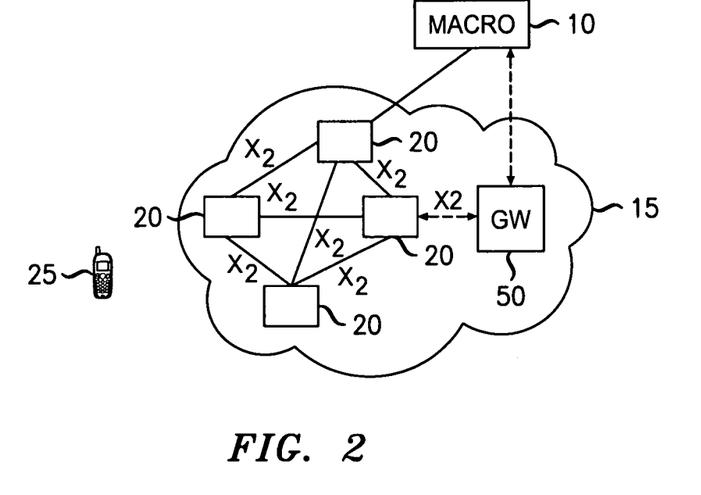
FIG. 2 illustrates a portion of a heterogeneous network (HTN) having multiple stacked cell layers according to an embodiment of the present invention.

FIG. 2 illustrates a portion of a heterogeneous network (HTN) having multiple stacked cell layers according to an embodiment of the present invention. FIG. 2, like FIG. 1, shows the coverage area of a macro cell served by a macro base station 10 also called an evolved nodeB or eNodeB. As shown, the coverage area includes a network 15 of pico cells, each served by a pico base station 20 also called a pico evolved NodeB or pico eNodeB. User equipment (UE) 25 falls within the coverage area of one or more of the pico base stations 20 and therefore the coverage area of the macro base station 10. The communication needs of the UE may be served by one of the communication nodes—pico base stations 20 or macro base station 10. If served by a pico base station 20, the UE's traffic may traverse the pico network 15 (i.e., from pico eNodeB to pico eNodeB) to a local gateway 50, and from the gateway 50 to other networks and/or the internet. Also, the UE's traffic may traverse the pico network 15 to the macro base station 10, and from the macro base station 10 to other networks and/or the internet. Still further, the UE's traffic may flow directly to and from the macro base station 10. As will be appreciated additional and/or different network layers may be present. For example, in addition to or instead of the pico network 15, a Femto network may exist or individual Femto cells may exist. While FIG. 2 only shows one UE 25, it will be appreciated that many UEs may be served by the HTN of FIG. 2.

In embodiments of the present invention, each communication node determines an amount of the resource to use based on resource usage price information and its own utility function associated with resource usage. In this discussion, the communication node under discussion will be referred to as the communication node of interest. The resource usage price information characterizes a cost associated with the communication node of interest using a resource, and the utility function of a communication node of interest characterizes utility derived by the communication node based on the amount of the resource used. These concepts will be described in greater detail below.

Statistical Analysis

Before describing the operation of the local gateway 50 and the communication nodes (e.g., pico nodes 20 and macro node 10) in detail with respect to FIGS. 3 and 4 below, the statistical underpinning of this operation will be described. For the purposes of this section we have in general a set of $L=\{1, \ldots, L\}$ links that constitute a network that is shared by a set of $S=\{1, \ldots, N\}$ sources. With respect to FIG. 2, the sources may be the pico base stations 20 and/or the macro base station 10. However, in general, the sources are the communication nodes in a communication system or in an HTN. The link or links may represent shared air interface resources. For example, with respect to FIG. 2, assume a first pico base station 20 competes for the air interface with a second and a third pico base station 20. Namely, the first, second and third pico base stations 20 generate interference with respect to one another. Accordingly, the resource may be transmission power, transmission rate, etc. With respect to the "links," a first link will represent the conflict between the first and second pico base stations 20, and a second link will represent the conflict between the first and third pico base stations 20. Accordingly, the links may be generated from the view point of the communication node of interest and the shared resource under consideration. For the air interface, a link may be said to exist between the communication node of interest and each communication node causing interference with the communication node of interest.

However, it will be appreciated that this analysis is not limited to shared or common resources and these virtual links. Instead, this analysis may also be applied to direct physical links such as the X2 interfaces between the pico base stations 20. However, for the purposes of discussion, the more complicated shared air interface example will be used in explaining the present invention.

Each source is characterized by a utility function $U_s(x_s)$ that is strictly concave, increasing and continuously differentiable function of the resource usage $x_s$. For example, the utility function may be a simple logarithm function such as $U_s(x_s) = \text{Log } x_s$. In a wireless communication system, the resource may be one of a frequency resource, a time resource, a power resource and a code resource. For example, the resource may be resource blocks, channel codes, transmission power, transmission rate, reception power, etc. With respect to FIG. 2 the resource characterizing the shared air interface may be transmission power, transmission rate, etc. because management of interference within the HTN may be of importance.

The path $L(s)$ is the set of links that the source is using. For each link let $S(l)=\{s \in S | l \in L(s)\}$ be the set of sources that use this link. The primal problem can be stated as follows:

$$\max_{x_s} \sum_s U_s(x_s) \quad (1)$$

$$\text{subject to } \sum_{s \in S(l)} x_s \leq c_l, l = 1, \ldots, L \quad (2)$$

where $c_l$ is a constraint (e.g., link capacity, maximum transmission rate over the link, etc.) and equation (2) simply says that the aggregate resource usage at any link does not exceed the capacity of the link.

This primal optimization problem has a solution since the utility function is strictly concave and the feasible region is convex. However, we are after a distributed solution to the problem that is of course practical in flow/rate control network problems. To obtain this solution, the primal problem is converted to its dual equivalent. The Lagrangian is $$L(x, p) = \sum_s U_s(x_s) - \sum_l p_l \left( \sum_{s \in S(l)} x_s - c_l \right) \quad (3)$$

$$= \sum_s \left( U_s(x_s) - x_s \sum_{l \in L(s)} p_l \right) + \sum_l p_l c_l \quad (4)$$

The Lagrange dual function is defined as, $$g(p) = \sup_{x_s} L(x, p) \quad (5)$$

$$= \sum_s \max_{x_s} (U_s(x_s) - x_s p^s) + \sum_l p_l c_l \quad (6)$$

$$\text{where } p^s = \sum_{l \in L(s)} p_l; \text{ and} \quad (7)$$

where $p_l$ is the resource usage unit price associated with each link l and $p^s$ is an aggregate price quantity at the source. The resource usage unit price $p_l$ characterizes the cost for the source to use the resource at the expense of other sources connected to the link being able to use the resource. For example, the resource usage unit price may be the cost to a first communication node for increasing transmit power and therefore using the air interface at the expense of a second communication node being able to use the air interface. Accordingly, for a resource (e.g., characterized by transmit power in this example) characterizing a shared commodity (e.g., air interface), the prices may be associated with other communication nodes, which as discussed above define the link. Also, while expressed as a single variable, the resource usage unit price or prices may be functions that vary based on resource usage. For example, the resource usage unit price may increase with increasing price. The aggregate price quantity characterizes the total cost for the source to use the resource at the expense of other sources linked thereto being able to use the resource. It should be understood, however, that the aggregate price quantity may be determined in other ways than simple addition. For example, a weighted addition may be performed to derive the aggregate price quantity.

The dual problem is then, $$\min_p g(p) \quad (8)$$

$$\text{subject to } p \geq 0 \quad (9)$$

The form of the Lagrange dual function points to the distributed implementation of the problem in that the amount of resource usage $x_s$ at a source may be determined as:

$$\max_{x_s}(U_s(x_s) - x_s p^s) \quad (10)$$

The resource usage $x_s$ may be determined based only on local information such as the aggregate price quantity $p^s$ and knowledge of the source's utility $U_s(x_s)$.

For example, assuming the resource is transmission rate or transmission power, the quantity $p^s$ is the total price per unit bandwidth across the path that the source is associated with. Thus when the source transmits a rate of $x_s$, then $x_s p^s$ is the total cost to satisfy this rate. On the other hand equation (10) represents the total benefit the source can achieve at a given price $p^s$. Since the utility function and constraints are such that there is no duality gap, the solution to the dual problem will be also a solution to the primal problem, and will be the optimal rate to the primal problem. The solution can be regarded as aligning individual optimality to global optimality. Namely, by solving for the resource usage unit prices in equation (8) subject to equation (9), the resource usage unit prices for the sources in the network that produce global optimality may be determined. As will be appreciated, determining this solution is an optimization problem that may be handled according to any well-known optimization algorithm such as simplex, interior point method, etc.

Taking the derivative of each local problem and setting it to zero provides:

$$\frac{\partial U_s(x_s)}{\partial x_s} = p^s \rightarrow x_s^* = U_{s'}(p^s)^{-1} \quad (11)$$

Arriving at the optimal resource usage unit prices p* can now be achieved iteratively. Gradient projection is applied where resource usage unit prices are adjusted in the opposite direction to the gradient of the utility function of the dual problem as shown below:

$$g(p) = \sum_s (U_s(x_s^*) - x_s^* p^s) + \sum_l p_l c_l \quad (12)$$

where $x_s^*$ is the optimal resource usage solution. This means each resource usage unit price may be iteratively determines according to:

$$p_l(t+1) = \max\left\{p_l(t) - \mu \frac{\partial g(p)}{\partial p_l}, 0\right\} \quad (13)$$

where t is time, $p_l(t+1)$ is the next resource usage unit price, $p_l(t)$ is the current resource usage unit price, and μ is a learning coefficient. The learning coefficient μ is a design parameter selected by the system designer, and is generally small, for example, about 0.01.

Figure 3:
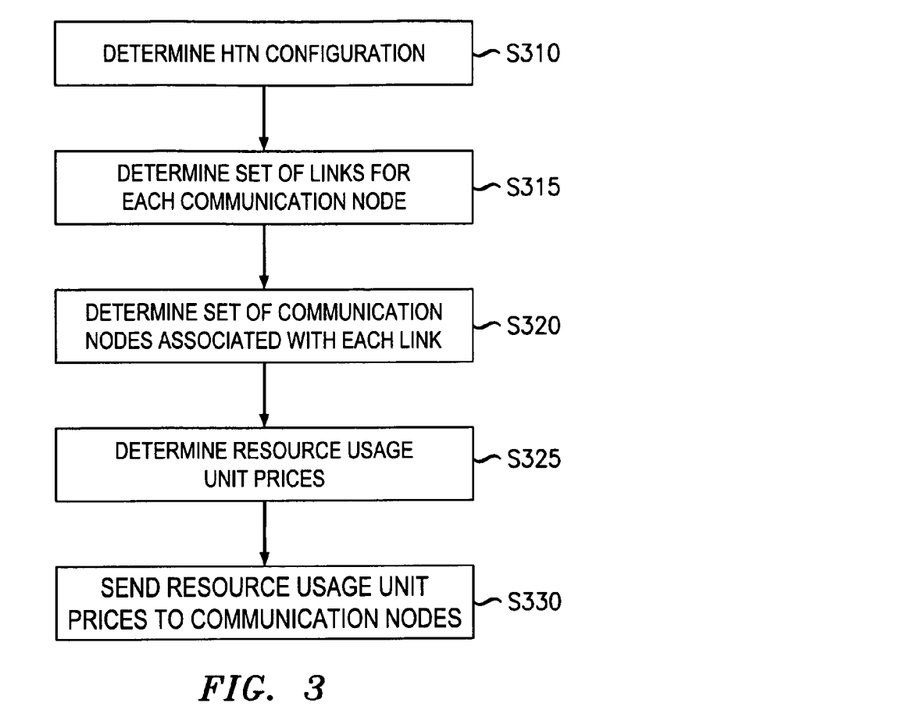
FIG. 3 illustrates a method of controlling resource usage in a communication network according to an embodiment.

Implementation of Statistical Analysis in Architecture of FIG. 2—Centralized Approach FIG. 3 illustrates a method of controlling resource usage in a communication network according to an embodiment. For the purposes of example only, the method will be described as implemented on the architecture of FIG. 2, but it will be appreciated that the present invention is not limited to this architecture.

As shown, in step S310, the local gateway 50 determines the configuration of the HTN. For example, the local gateway 50 may receive messages from the communication nodes (e.g., pico base stations 20 and macro base station 10) indicating the other communication nodes to which they are virtually linked, physically linked, with which they interface, etc. For example, in the shared air interface context, a communication node of interest may report the communication nodes generating interference with respect to the communication node of interest. As an example of a physical link, the communication nodes may identify their X2 interfaces. These and/or other messages may indicate the type of links (e.g., air interface, X2 interface), the type of communication nodes, the capabilities and capacities of the communication nodes and links, etc. Such messages and the information contained in these messages are very well-known and are often dictated by the standards under which the networks of the HTN operate.

It will be also appreciated, that the local gateway 50 may set forth the configuration information and/or a portion thereof. For example, U.S. Application No. unknown, filed concurrently with the present disclosure, by the same inventor, entitled METHOD OF CONFIGURING INTEFACES BETWEEN A PLURALITY OF COMMUNICATION NODES, and hereby incorporated by reference in its entirety, provides a method by which the local gateway determines the interfaces (e.g., X2 interfaces) between the communication nodes.

Accordingly, the messages convey the constraints such as discussed above with respect to equation (2), but also may convey the utility functions of communication nodes such as discussed above with respect to equation (1). For example, each communication node may be pre-programmed with a utility function depending on the resource. Alternatively, the local gateway 50 may be programmed with the utility functions for each communication node or a class of communication nodes. For example, the local gateway 50 may be programmed to apply the same utility function to each pico base station 20.

From the configuration information, the local gateway 50 determines the set of links L(s) that each communication node is using in step S315. For each link S(l), the local gateway 50 determines the set of communication nodes S(l)= {s∈S||l∈L(s)} (i.e., sources in the above statistic analysis section) that use this link in step S320.

Next, in step S325, the local gateway 50 determines the resource usage unit prices for the links associated with a communication node according to equations (8) and (9). Namely, the local gateway 50 determines, for each communication node, the resource usage unit prices $p_l$ that minimize g(p) subject to p≥0, where $$g(p) = \sum_s \max_{x_s}(U_s(x_s) - x_s p^s) + \sum_l p_l c_l$$

$$\text{and } p^s = \sum_{l \in L(s)} p_l$$

as discussed above with respect to equations (6) and (7). From the configuration information the utility functions and constraints are known, leaving only the resource usage unit prices as the unknown variables. As discussed above, determining this solution is an optimization problem that may be handled according to any well-known optimization algorithm such as simplex, interior point method, etc.

Having determined the resource usage unit prices, the local gateway 50 sends the resource usage unit prices to the communication nodes in step S330.

Figure 4:
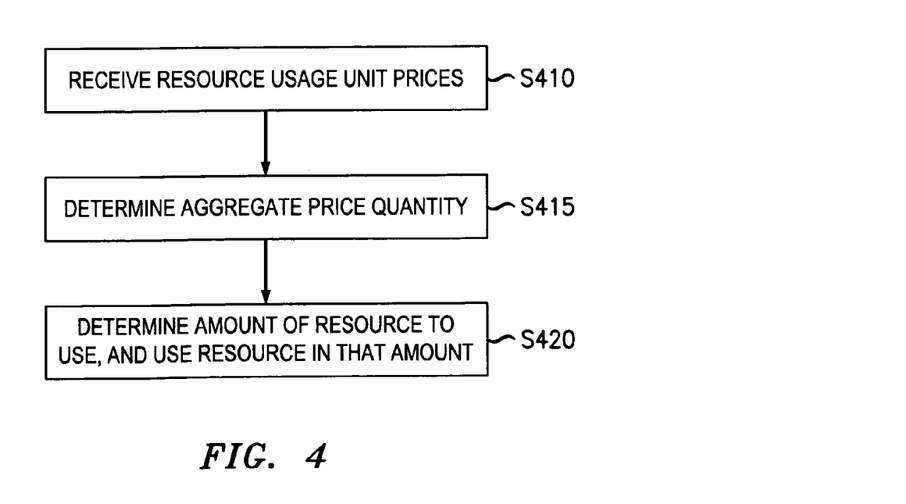
FIG. 4 illustrates a method of controlling resource usage at a communication node according to an embodiment.

FIG. 4 illustrates a method of controlling resource usage at a communication node according to an embodiment. For the purposes of example only, the method will be described as implemented on the architecture of FIG. 2, but it will be appreciated that the present invention is not limited to this architecture. The method of FIG. 4 may be implemented at each communication node (e.g., each of the pico base stations 20 and macro base station 10). Accordingly, implementation of the method of FIG. 4 at a single communication node will be described.

As shown, in step S410, the communication node receives resource usage unit prices. For example, these may be the resource usage unit prices sent by the local gateway 50 in step S330. In step S415, the communication node of interest determines the aggregate price quantity $p^s$ according to equation (7). Then, in step S420, the communication node of interest determines the amount of resource to use according to $$\frac{\partial U_s(x_s)}{\partial x_s} = p^s \rightarrow x_s^* = U_{s'}(p^s)^{-1},$$

which is equation (11) discussed in detail above, and uses that amount of resource in operation. As will be recalled, each communication node may be pre-programmed with its utility function $U_s(x_s)$ depending on the resource $x_s$. Alternatively, the local gateway 50 may be programmed with the utility functions for each communication node or a class of communication nodes. For example, the local gateway 50 may be programmed to apply the same utility function to each pico base station 20. In this case, the local gateway 50 sends the utility function for the communication node to the communication node.

It will be appreciated that by implementing the methods of FIGS. 3 and 4, the local gateway 50 controls resource usage in the HTN to provide for global optimality. For example, where interference is a concern, transmission power or transmission rate may be set as the resource and each communication node determines in step S420 its transmission power or transmission rate.

The embodiment above is not limited to managing a single resource. Instead, multiple resources may be managed. For example, the communication nodes may have a different utility function associated with each resource. Similarly, different constraints may be associated with each resource. The local gateway 50, therefore, determines different sets of resource usage unit prices associated with a communication node for each resource.

It will be obvious that the embodiment may be varied in many ways. For example, the local gateway 50 may determine the aggregate price quantity for each communication node, and send each communication node its aggregate price quantity. This variation would allow steps S410 and S415 of FIG. 4 to be eliminated.

Figure 5:
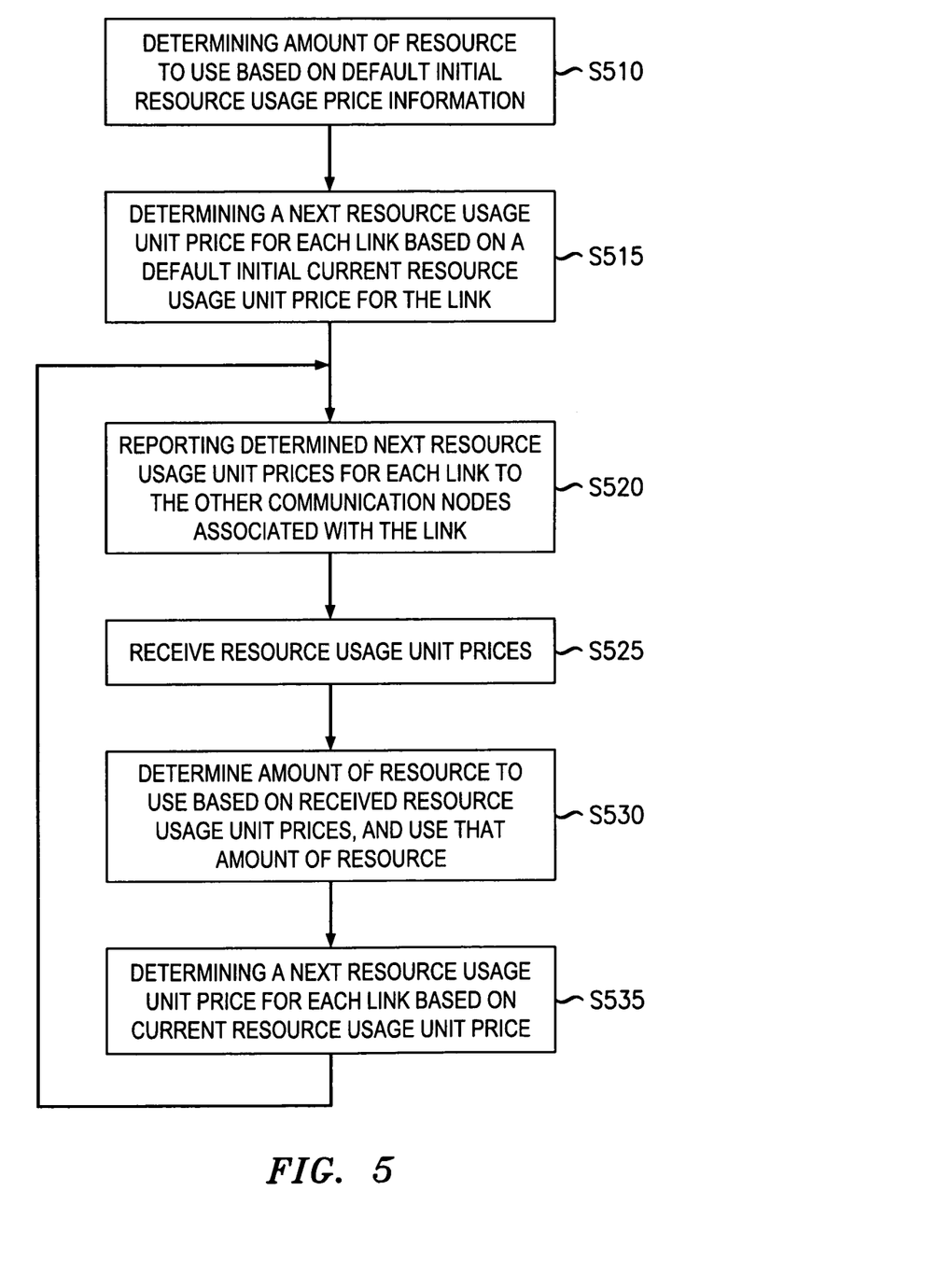
FIG. 5 illustrates a method of controlling resource usage in a communication network according to another embodiment.

Implementation of Statistical Analysis in Architecture of FIG. 2—Distributed Approach Unlike the embodiment of FIG. 3 in which the local gateway 50 centrally controlled and managed resource usage. In this embodiment, control of resource usage is distributed to the communication nodes themselves. FIG. 5 illustrates a method of controlling resource usage in a communication network according to an embodiment. For the purposes of example only, the method will be described as implemented on the architecture of FIG. 2, but it will be appreciated that the present invention is not limited to this architecture. The method of FIG. 5 may be implemented at each communication node (e.g., each of the pico base stations 20 and macro base station 10). Accordingly, implementation of the method of FIG. 5 at a single communication node will be described.

As shown, in step S510, the communication node of interest determines the amount of resource to use according to $$\frac{\partial U_s(x_s)}{\partial x_s} = p^s \rightarrow x_s^* = U_{s'}(p^s)^{-1},$$

which is equation (11) discussed in detail above, and uses that amount of resource in operation. As will be recalled, each communication node may be pre-programmed with its utility function $U_s(x_s)$ depending on the resource $x_s$. Alternatively, the local gateway 50 may be programmed with the utility functions for each communication node or a class of communication nodes and report the utility functions to the communication nodes. In this initial determination, the communication node of interest uses a default price associated with each link to determined the aggregate price quantity $p^s$. For example, the default initial price may be 1 for each link.

As discussed previously, for a shared resource such as associated with the air interface, the communication node of interest determines each link by detecting each interfering source (e.g., each communication node generating interference with respect to the communication node of interest). In this manner, each resource usage price may also be considered as being associated with one of these interfering communication nodes. These interfering communication nodes may also be referred to as linked nodes in view of the hypothetical or virtual link between each interfering communication node and the communication node of interest.

Next, in step S515, the communication node of interest determines a next resource usage unit price for each link with which the communication node of interest is associated. Each next resource usage unit price $p_l(t+1)$ is determined according to $$p_l(t+1) = \max\left\{p_l(t) - \mu \frac{\partial g(p)}{\partial p_l}, 0\right\},$$

which is equation (13) above. Here, a default initial current resource usage unit price $p_l(t)$ is used for each link. This default price may be 1, for example.

In step S520, the communication node of interest reports the determined resource unit price for each link to the other communication node associated with that link. Associated therewith, the communication node of interest receives the resource usage unit prices from the communication nodes linked thereto in step S525. As will be appreciated, steps S520 and S525 may be performed concurrently.

In step S530, the communication node of interest determines the amount of resource to use according to which is $$\frac{\partial U_s(x_s)}{\partial x_s} = p^s \rightarrow x_s^* = U_{s'}(p^s)^{-1},$$

equation (11) discussed in detail above, and uses that amount of resource in operation. Here, the resource usage unit prices received in step S525 are used by the communication node of interest to determine the aggregate price quantity $p^s$.

Then, in step S535, the communication node of interest determines a next resource usage unit price for each link with which the communication node of interest is associated. Each next resource usage unit price $p_l(t+1)$ is determined according to $$p_l(t+1) = \max\left\{p_l(t) - \mu \frac{\partial g(p)}{\partial p_l}, 0\right\},$$

which is equation (13) above.

Processing then returns to step S520, and steps S520 through S535 are continuously reiterated. In this manner, the resource usage unit prices converge to optimal amounts, and therefore, the amount of resource used by each communication node converges to an optimal amount. Still further, as the network configuration and/or operating conditions change (e.g., new link arise and/or old links terminate), the determined amount of resource used by each communication node converges to a new optimal amount.

As will be appreciated in this distributed approach, each communication node self-determines the optimal amount of resource to use.

The invention being thus described, it will be obvious that the same may be varied in many ways. Such variations are not to be regarded as a departure from the invention, and all such modifications are intended to be included within the scope of the invention.

What is claimed:

1. A method of controlling resource usage at a communication node within a network, comprising:
    detecting, at the communication node, interfering communication nodes within the network that are causing interference on a resource shared between the communication node and the interfering communication nodes;
    sending, from the communication node, a message to a gateway, the message indicating the detected interfering communication nodes and a utility function of the communication node, the utility function representing a utility derived by the communication node as a function of an amount of the resource used by the communication node;
    receiving, at the communication node, resource usage price information from the gateway, the resource usage price information characterizing a cost associated with the communication node forwarding data using the resource at the expense of the detected interfering communication nodes forwarding data using the resource shared therebetween, the cost determined based on the utility function of the communication node and utility functions of the detected interfering communication nodes; and
    first determining, at the communication node, an amount of the resource for the communication node to use based on the received resource usage price information.

2. The method of claim 1, wherein the resource is one of a frequency resource, a time resource, a power resource and a code resource.

3. The method of claim 2, wherein the resource is resource blocks.

4. The method of claim 2, wherein the resource is channel codes.

5. The method of claim 2, wherein the resource is one of transmission power, transmission rate, and reception power.

6. The method of claim 1, wherein
    the receiving step receives a resource usage unit price for each link associated with the communication node as the resource usage price information, each resource usage unit price characterizing a cost to the communication node to use the resource at the expense of other communication nodes associated with the link.

7. The method of claim 6, wherein each link represents a virtual link between the communication nodes associated with a shared air interface.

8. The method of claim 1, wherein the received resource usage price information characterizes the cost of using the resource as a function of resource usage.

9. The method of claim 1, further comprising:
    second determining, at the communication node, an aggregate price quantity from the received resource usage price information, the aggregate price quantity characterizing the cost of using the resource at the expense of other communication nodes being able to use the resource; and wherein
    the first determining step determines the amount of the resource to use based on the determined aggregate price quantity.

10. The method of claim 9, wherein
    the receiving step receives a resource usage unit price for each link associated with the communication node as the resource usage price information, each resource usage unit price characterizing a cost to the communication node to use the resource at the expense of other communication nodes associated with the link; and
    the second determining step determines the aggregate price quantity from the received resource usage unit prices.

11. The method of claim 10, further comprising:
    third determining, at the communication node for each link with which the communication node is associated, a next resource usage unit price based on a current resource usage unit price; and
    sending the determined resource usage unit prices to the communication nodes associated with the links.

12. The method of claim 10, wherein
    the receiving step, the first determining step, and the third determining step are repeated.

13. The method of claim 9, wherein the receiving step receives the aggregate price quantity as the resource price information.

14. The method of claim 9, wherein the first determining step determines the amount of resource to use based on the determined aggregate price quantity and a utility function, the utility function characterizes utility derived by the communication node based on the amount of the resource used at the communication node.

15. The method of claim 14, wherein the utility function is concave, increasing and continuously differentiable.

16. The method of claim 14, wherein the first determining step maximizes each amount given the utility function and the aggregate price quantity.

17. A method of controlling resource usage in a communication network including a plurality of communication nodes, each of the plurality of communication nodes configured to serve communication needs of mobile devices, the serving consuming a resource shared between the communication nodes, each communication node determining an amount of the resource to use based on resource usage price information, the resource usage price information characterizing a cost associated with the communication node using the resource to forward data to and from the mobile devices, the method comprising:
determining, at a control entity, resource usage price information for each of the communication nodes based on utility functions associated with the communication nodes, each utility function characterizing utility derived by an associated communication node as a function of the amount of the resource used by the associated communication node and the resource usage unit price information characterizing a cost of the associated communication node forwarding data using the resource at the expense of other communication nodes forwarding data using the resource shared therebetween; and
sending, from the control entity, the resource usage price information, to the plurality of communication nodes.

18. The method of claim 17, wherein the determining step determines the resource usage unit price based on the utility function of the communication node and constraints on the resource such that the utility function of the communication node is maximized given the constraints.

19. The method of claim 17, wherein the sending step sends at least one communication node an aggregate price quantity, the aggregate price quantity characterizing the cost of using the resource at the expense of the other communication nodes being able to use the resource.

20. The method of claim 19, further comprising:
determining the aggregate price quantity for the communication node based on the utility function associated with the communication node.

21. The method of claim 20, wherein the determining step determines the aggregate price quantity based on the utility function of the communication node and constraints on the resource such that the utility function of the communication node is maximized given the constraints.

22. The method of claim 17, wherein each communication node determines the amount of the resource to use based on the resource usage price information and the utility function associated with the communication node and the method further comprises:
sending, from the control entity, at least one communication node the utility function for the communication node.

23. A method of controlling usage of a resource shared between a plurality of communication nodes in a communication network, the plurality of communication nodes configured to serve communication needs of mobile devices over links, the serving consuming an amount of the resource shared between the communication nodes, comprising:
determining, at a communication node of the plurality of communication nodes, a next resource usage unit price based on a current resource usage unit price for each of the links and a utility function, each resource usage unit price characterizing a cost to other communication nodes associated with the link of the plurality of communication nodes to use the resource at the expense of the communication node using the amount of the resource to forward data to and from the mobile devices and the utility function characterizing utility derived by the communication node as a function of the amount of the resource used by the communication node; and
sending the determined resource usage unit prices to the other communication nodes associated with the links.

* * * * *